R. E. WILLIAMS.
CLAMP FOR SPOTLIGHT BRACKETS AND THE LIKE.
APPLICATION FILED AUG. 8, 1919.
1,416,148.
Patented May 16, 1922.
2 SHEETS—SHEET 1.
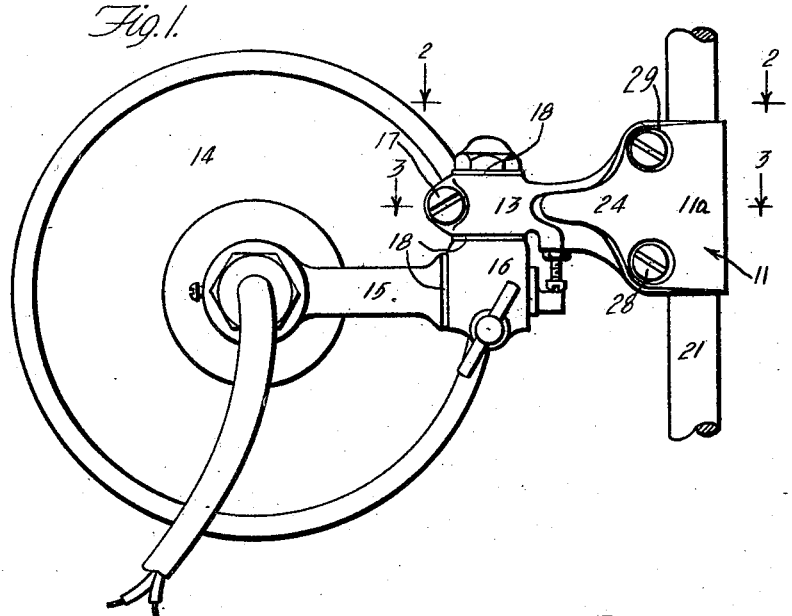
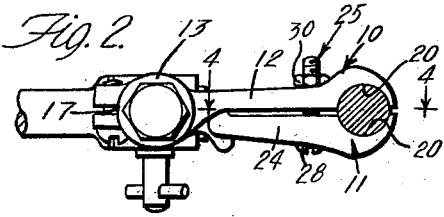
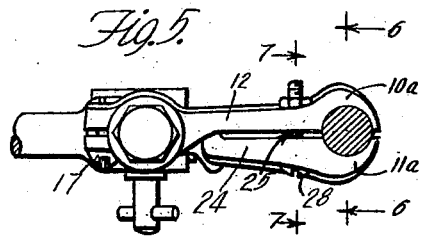
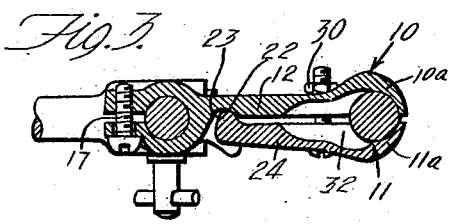
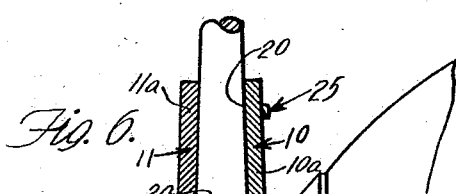
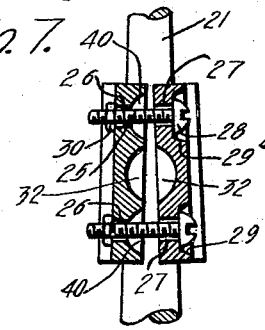
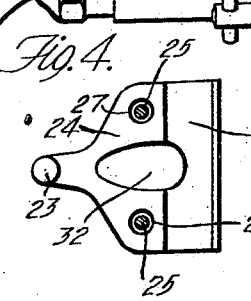
Inventor
Ralph E. Williams
by
his Attorney.

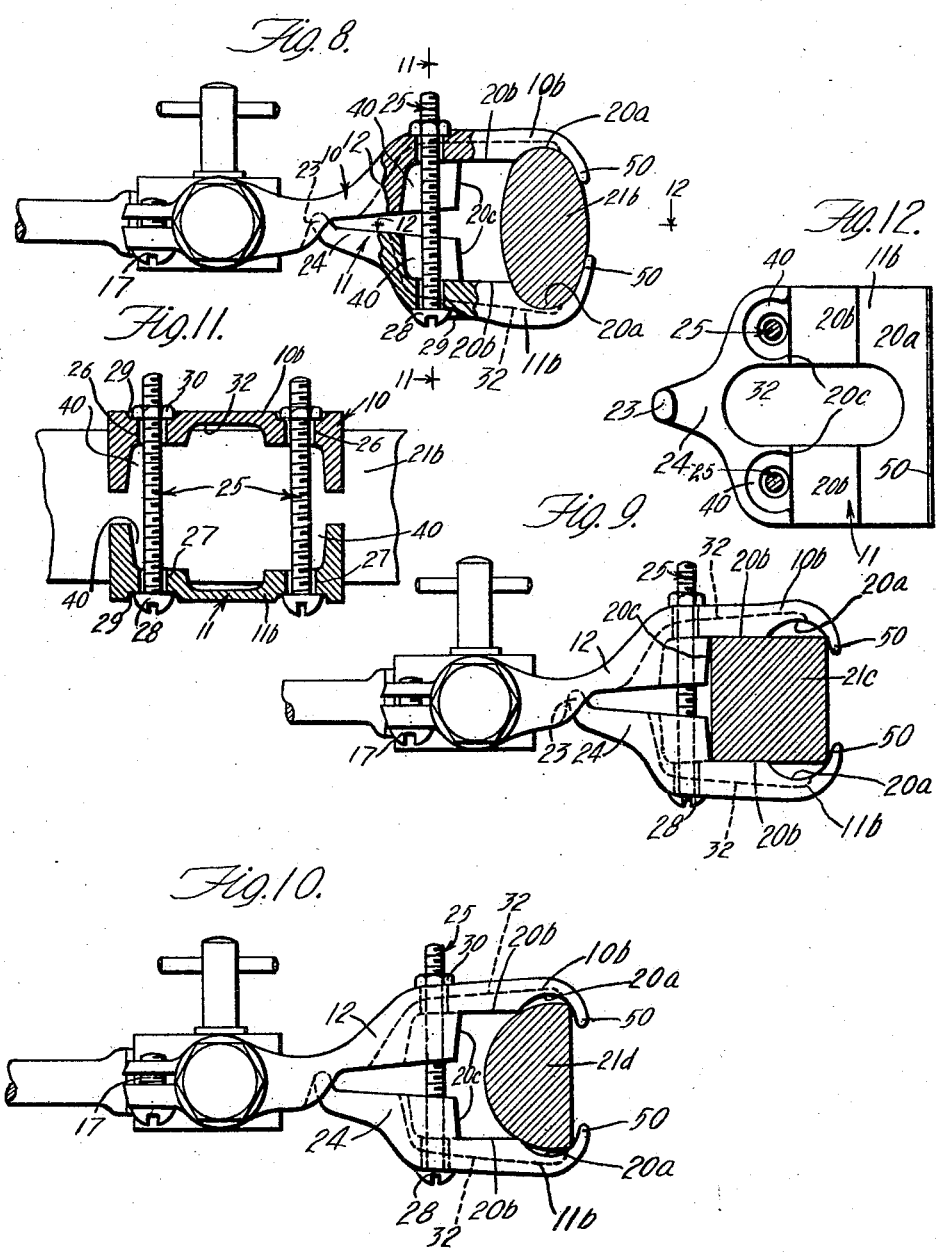

UNITED STATES PATENT OFFICE.

RALPH E. WILLIAMS, OF LOS ANGELES, CALIFORNIA.

CLAMP FOR SPOTLIGHT BRACKETS AND THE LIKE.

1,416,148. Specification of Letters Patent. Patented May 16, 1922.

Application filed August 8, 1919. Serial No. 316,055.

*To all whom it may concern:*

Be it known that I, RALPH E. WILLIAMS, a citizen of the United States, residing at Los Angeles, in the county of Los Angeles, State of California, have invented new and useful Improvements in Clamps for Spotlight Brackets and the like, of which the following is a specification.

This invention relates to improvements in clamps and particularly to clamps such as are used for mounting headlight brackets on automobiles. An object of the invention is to provide a clamp of this general character which will be simple, effective, inexpensive, and which may be effectively clamped on standards or frames of various sizes.

Although the clamp is particularly adapted for mounting automobile headlights, and specifically, automobile spotlights, it is not limited to such use, but may be used in connection with various kinds of lights, and the like, and may be advantageously used in mounting various other articles; for instance, side windshields such as are commonly used in connection with main windshields can be mounted on the main windshield standard by means of a clamp such as is provided by this invention.

A particular object of the invention is to provide a clamp which may be effectively used in connection with various sized and shaped frames or standards. Automobile spotlights are practically always mounted or attached to one side or end of the windshield, and generally, they are connected to the standard which supports the panels of the windshield. Although windshield standards are similar in their general design in the various makes of automobiles, they vary in cross section and shape. For instance, some windshield standards are round in cross section while others are oval, and some standards are straight while others are tapered. By the present invention a clamp is provided by which a lamp bracket, or the like, may be firmly attached or mounted on various sized or shaped windshield standards.

A feature of the invention is the construction which allows the clamp to be firmly or solidly clamped to a windshield frame of any configuration. This invention provides a construction which makes the clamp self-centering and adjusting and provides a leverage arrangement which causes the clamp screws when tightened to hold the clamp jaws in place with great firmness. Further objects of the invention and the means by which I effect these objects are clearly set forth in the following description wherein I describe a preferred form of device embodying my invention, reference being had throughout the description to the accompanying drawings in which—

Fig. 1 is a side view of the clamp showing it in connection with a typical windshield standard and carrying a typical spotlight and bracket; Fig. 2 is a section taken as indicated by line 2—2 on Fig. 1 showing a plan view of the clamp; Fig. 3 is a section taken as indicated by line 3—3 on Fig. 1 showing the clamp in section; Fig. 4 is a section taken as indicated by line 4—4 on Fig. 2 showing one of the clamping jaws; Fig. 5 is a view similar to Fig. 2 showing the clamp mounted on a tapered windshield standard; Fig. 6 is a section taken as indicated by line 6—6 on Fig. 5, showing the manner in which the clamping jaws engage the windshield standard; Fig. 7 is a section taken as indicated by line 7—7 on Fig. 5; Fig. 8 is a plan view of a preferred form of clamp with parts broken away to show in section, showing the clamp on an oval windshield standard; Fig. 9 is a view similar to Fig. 8 showing the clamp in connection with a square windshield standard; Fig. 10 is a view similar to Figs. 8 and 9 showing the clamp in connection with a half round windshield standard; Fig. 11 is a section taken as indicated by line 11—11 on Fig. 8; and Fig. 12 is a section taken as indicated by line 12—12 on Fig. 8.

In the drawings numeral 10 designates one of the clamping members, while numeral 11 designates the other clamping member. The clamping member 10 has an extended portion or arm 12 at the end of which there is an enlarged head 13. The enlarged head 13 provides a means by which the lamp 14 may be attached to the clamp. The connection between the lamp 14 and the clamp, or the enlarged head 13 on the end of arm 12, may be made in any suitable manner. For instance, as shown in the drawings, the lamp 14 may be provided with a trunnion 15 which is pivotally carried in a universal block 16 which in turn is pivotally carried in the en larged head 13 at the end of the arm 12. In this particular form of construction the enlarged head 13 is split, and a clamping screw 17 is provided to regulate the friction of the joint. The pivotal joints in this form of mounting are preferably normally tight enough to prevent movement of the lamp due to vibration or jarring of the machine at the same time allowing the lamp to be adjustable by hand.

The inner surfaces of the clamping jaws 10$^a$ and 11$^a$ are concaved and said concaved portions are preferably of a configuration which will fit a round or oval windshield standard. In the drawings is shown a windshield standard 21 which is round in cross section and the concave surfaces 20 of the jaws 10$^a$ and 11$^a$ are made to fit the curvature of said standard 21. Although it is preferred that the concave surfaces 20 be shaped substantially as shown in the drawings, it will be readily understood that they may be any suitable shape. In Figs. 8, 9, 10, 11 and 12 a form of clamp jaws is shown which is particularly adapted for use in connection with oval, square or half round windshield standards. In this form of clamp the inner surfaces of the clamp members 10 and 11 at the jaw portions 10$^b$ and 11$^b$ have curved portions 20$^a$ and flat portions 20$^b$ and 20$^c$. The curved portions 20$^a$ are particularly adapted to engage and fit an oval windshield standard 21$^b$ as shown in Fig. 8 while the flat surfaces 20$^b$ and 20$^c$, which are substantially at right angles with each other, are particularly adapted to engage a square standard 21$^c$ as shown in Fig. 9. It will be particularly noted that the end portions 50 of the jaws 10$^b$ and 11$^b$ extend inwardly toward each other far enough to prevent a square windshield standard from pulling out of the clamp. Due to this construction this form of clamp is also particularly well suited for a standard 21$^d$ that is half round in cross section as shown in Fig. 10. It will be noted that when the clamp is used in connection with a half round standard that the end portions 50 of the jaws engage the flat side of the standard and thereby prevent the standard from pulling out of the clamp. This form of clamp jaws can be advantageously used in connection with standards of other various shapes not herein mentioned.

In the arm 12 of the clamp member 10 a considerable distance from the jaw 10$^a$ there is an indentation or socket 22. The socket 22 is on the inner side of the arm 12 and is adapted to receive a ball or knob 23 which is on the end of an arm 24 that extends from the clamp jaw 11$^a$. The shape of the arm 24 is clearly shown in Figs. 1 and 4 while the manner in which the knob 23 engages the socket 22 is clearly shown in Fig. 3. It will be clearly seen from the drawings that the point of contact between the knob 23 and the socket 22 is the only point of contact between the two clamping members 10 and 11.

Extending through the clamping members 10 and 11, and lying between the jaw portions 10$^a$ and 11$^a$ and the knob and socket 23 and 22 respectively, there are clamping screws 25. The clamping screws 25 are preferably located as close to the jaws 10$^a$ and 11$^a$ as they can be. The clamping screws 25 are carried in apertures or holes 26 in the clamping members 10 and in apertures 27 in member 11 and said screws have heads 28 which fit into recesses 29 in the member 11 and have nuts 30 screw threaded on the ends which project through the member 10. It will be readily seen how tightening of the nuts 30 on the clamping screws 25 will cause the jaws 10$^a$ and 11$^a$ to firmly grip the standard 21. The tightening of the nuts 30 on the clamping screws 25 causes the jaws 10$^a$ and 11$^a$ to grip the standard 21 a great deal tighter than an ordinary clamp would grip it, due to the fact that the point of contact between the two clamping members 10 and 11 is considerable distance from the point at which they engage the standard 21 and the clamping screws 25 are near the point of engagement of the jaws with the standard 21, thereby giving them considerable leverage.

Not only do the jaws 10$^a$ and 11$^a$ grip the standard 21 firmly due to the arrangement and construction just described, but they also grip the standard evenly, because the clamping members do not rigidly engage each other and have only one point of contact with each other. The clamping screws 25 fit loosely in the holes 26 and 27 as shown in Fig. 7 and the knob 23 fits the socket 22 so that it is free to tilt or move in said socket, thereby allowing the two clamp members to tilt or set at considerable angle and at the same time form an effective clamp. In order to positively assure the clamp against binding on the screws 25 when the jaws are set at considerable angle the holes 26 and 27 are made comparatively short, as shown in the drawings. The recesses 29 in the clamp member 11 cause the holes 27 to be short while recesses 40 in the inner side of clamp member 10 cause holes 26 to be short. In order that the clamp may have sufficient holding power it is not necessary for the jaws 10$^a$ and 11$^a$ to engage the standard along their entire length or completely around the standard at all points. Due to this fact recesses 32 may be provided in the inner surfaces of the clamp members which recesses cause the jaw portions to completely grip the standard only at their ends. The recesses 32 and also the recesses 29 and 40 effect a great saving in material and also cut down the weight of the clamp without weakening it or materially affecting its holding power. This cutting away, or recessing, of the clamp jaws makes it certain that the jaws will always clamp tightly at their ends, thus eliminating any possibility of rocking of the clamp on the windshield standard; and this is true, no matter what taper or irregularity of shape the standard may have, because the jaws can set themselves at any relative angular position, as desired.

In the form of clamp shown in Figs. 8 to 12 the construction, except the jaw portions as hereinabove described, is substantially the same as in the other form. Clamping screws 25 are provided which extend through holes 26 and 27 and there are also recesses 29 and 40. It will be noted in the drawings that in this form of clamp there are recesses 40 in the inner surfaces of both clamping members 10 and 11 and that there are recesses 29 in the outer surfaces of both clamping members; heads 28 of clamping screws 25 engage the recesses 29 in member 11 while nuts 30 engage the recesses 29 in member 10. In this form of clamp the clamp members 10 and 11 have recesses 32 which are substantially the same as the recesses 32 in the other form. The configurations of the recesses 32 are clearly shown in Figs. 8 to 11 and 12.

In Figs. 5, 6 and 7 the clamp is shown in connection with a tapering standard 21ᵃ. It will be noted in the drawings and particularly in Fig. 6 that the jaws 10ᵃ and 11ᵃ fit evenly on the surface of the standard 21ᵃ. Fig. 7 clearly shows how the clamping screws are carried in the holes 26 and 27 without binding when the clamping members are tilted.

Having hereinabove set forth a preferred form of the invention I do not wish to limit myself to the design or to the details of construction hereinabove set forth, but, on the other hand, wish to reserve to myself any change or modifications that may appear to those skilled in the art, or fall within the scope of the following claims.

Having described a preferred form of my invention, I claim:

1. A clamp of the character described embodying two clamp members having jaw portions and engaging portions said jaw portions having corresponding curved surfaces and flat surfaces, said engaging portions being removed from the jaw portions and forming a single point of contact between the clamp members, and clamping means in connection with the clamp members between the engaging portion and the jaw portions.

2. A clamp of the character described embodying two clamp members having jaw portions and engaging portions, said jaw portions having corresponding curved and flat surfaces in their inner surfaces, said curved surfaces being in the outer portion of the jaws and said flat surfaces being in the inner portion of the jaws, said engaging portions being removed from the jaw portions and forming a single point of contact between the clamp members, and clamping means in connection with the clamp members between the jaw portions and the engaging portions.

3. A clamp of the character described embodying two clamp members having jaw portions and engaging portions, the jaw portions have similar and opposite clamping surfaces, the clamping surfaces comprising two opposite parallel surfaces, two surfaces substantially at right angles with the parallel surfaces and in substantially the same plane, and curved surfaces at the ends of the parallel surfaces, the body portions of the jaw portions at the ends of the curved surfaces extending inwardly toward each other and through the planes of the parallel surfaces, the engaging portions being removed from the jaw portions and forming a single point of contact between the clamp members, and clamping means in connection with the clamp members between the jaw portions and the engaging portions.

4. A clamp of the character described, embodying two clamp members having jaw portions and engaging portions, said jaw portions having complementary curved surfaces and flat surfaces, the curved surfaces being positioned adjacent the outer ends of the jaw portions, and their outer sides projecting inwardly toward each other and beyond the planes of the flat surfaces, the engaging portions being removed from the jaw portions, and clamping means intermediate said engaging portions and jaw portions.

In witness that I claim the foregoing I have hereunto subscribed my name this 30th day of July, 1919.

RALPH E. WILLIAMS.

Witness:
VIRGINIA I. BERINGER.